United States Patent [19]

Fujii et al.

[11] Patent Number: 5,190,696
[45] Date of Patent: Mar. 2, 1993

[54] PROCESS FOR PREPARATION OF CARBONACEOUS MOLDED BODY HAVING EXCELLENT COMPRESSIVE ELASTICITY

[75] Inventors: Masaki Fujii, Sakai; Masanori Minohata, Izumi, both of Japan

[73] Assignee: Koa Oil Company, Limited, Tokyo, Japan

[21] Appl. No.: 582,837

[22] PCT Filed: Feb. 6, 1990

[86] PCT No.: PCT/JP90/00143
§ 371 Date: Oct. 5, 1990
§ 102(e) Date: Oct. 5, 1990

[87] PCT Pub. No.: WO90/09346
PCT Pub. Date: Aug. 23, 1990

[30] Foreign Application Priority Data

Feb. 7, 1989 [JP] Japan .................................. 1-27874
Feb. 7, 1989 [JP] Japan .................................. 1-27875

[51] Int. Cl.$^5$ .......................... H01B 1/04; C01B 31/00
[52] U.S. Cl. ................................ 252/502; 252/511; 264/29.1; 264/105; 264/118; 264/119; 423/445; 423/448
[58] Field of Search ................ 252/511, 502; 423/445, 423/449, 448; 264/29.1, 105, 118, 119

[56] References Cited

U.S. PATENT DOCUMENTS

| | | | |
|---|---|---|---|
| 3,969,124 | 7/1976 | Stewart | 423/448 |
| 4,534,951 | 8/1985 | Kortovich et al. | 423/448 |
| 4,582,632 | 4/1986 | Rokujo et al. | 252/502 |
| 4,816,289 | 3/1989 | Kamatsu et al. | 252/502 |
| 4,824,739 | 4/1989 | Breault et al. | 429/13 |
| 4,873,071 | 10/1989 | Yamada et al. | 423/448 |
| 4,897,170 | 1/1990 | Chandramouli | 252/511 |
| 4,908,200 | 3/1990 | Fujii et al. | 423/448 |
| 4,923,637 | 5/1990 | Yagi et al. | 252/511 |
| 5,017,358 | 5/1991 | Yamada et al. | 423/449 |
| 5,057,297 | 10/1991 | Fujii et al. | 423/445 |
| 5,137,667 | 8/1992 | Fujii et al. | 264/104 |

FOREIGN PATENT DOCUMENTS 1-145370 6/1989 Japan .

Primary Examiner—Paul Lieberman
Assistant Examiner—Bradley A. Swope
Attorney, Agent, or Firm—Wenderoth, Lind & Ponack

[57] ABSTRACT

Disclosed is a process for the preparation of a carbonaceous molded body, which comprises mixing elastic graphite particles with a binder and molding the mixture. A carbonaceous molded article having a light weight and an excellent elasticity, which is characterized by a bulk density lower than 1.0 g/cm$^3$ and a recovery ratio of 50% or more at a compressibility of 5 to 50%, is obtained according to this process.

10 Claims, No Drawings

PROCESS FOR PREPARATION OF CARBONACEOUS MOLDED BODY HAVING EXCELLENT COMPRESSIVE ELASTICITY

TECHNICAL FIELD

The present invention relates to a carbonaceous material. More particularly, the present invention relates to a process for the preparation of a carbonaceous molded body having a light weight and an excellent elasticity.

BACKGROUND ART

In general, a carbonaceous molded body is prepared by adding a binder to a powder of a carbonaceous material such as graphite or coke, kneading the mixture, molding and curing the mixture, and if necessary, firing and graphitizing the molded and cured body. Since the properties required for the prepared carbonaceous molded body differ according to the intended purpose and use of the molded body, various preparation processes have been adopted, and various proposals have been made on the molding method and the kind of the binder (see, for example, "Guide to Carbon Materials", revised edition, page 135, compiled by the Association of Carbon Materials; Mizushima and Okada, "Carbon Materials", page 55, published by Kyoritsu Shuppan; and Ishikawa and Nagaoki, "New Carbon Technology", page 173, published by Kindai Henshusha).

These conventional carbonaceous molded bodies retain characteristic properties of carbon, such as light weight, high strength, high Young's modulus, electroconductivity, corrosion resistance, heat resistance and slidability. High Young's modulus of the conventional materials is relatively advantageous when a high rigidity is required. However, the conventional materials are defective in that the pliability is poor, and from the viewpoint of safety, a material having a higher strength is now required.

We previously proposed an elastic graphite body having excellent elasticity characteristics as the carbonaceous material (Japanese Patent Laid-Open Publication No. 1-9808). This elastic graphite body has a light weight and a good elasticity, and has excellent characteristics not possessed by the conventional carbonaceous materials.

However, although this carbonaceous material per se has good characteristics, since the material is in the form of a powder or granule, the material cannot be used singly, but the material should be mixed with other material or be used in the state of being packed in a vessel. Furthermore, even if the material is placed in such a restricted state, it is not easy to mold the material while sufficiently utilizing excellent properties possessed inherently by the material.

DISCLOSURE OF THE INVENTION

The present invention has been completed under the above-mentioned background, and it is an object of the present invention to provide a novel carbonaceous molded body having a light weight and an excellent compressive elasticity.

The characteristic feature of the present invention resides in a process for preparing such a carbonaceous molded body without degrading elasticity characteristics possessed inherently by elastic graphite particles as the constituent material.

More specifically, in accordance with the present invention, there is provided a process for the preparation of a carbonaceous molded body, which comprises mixing elastic graphite particles with a binder and molding the mixture to obtain a carbonaceous molded body having a light weight and an excellent elasticity, which has a bulk density lower than 1.0 g/cm$^3$ and a recovery ratio of at least 50% at a compressibility of 5 to 50%.

Furthermore, in accordance with the present invention, there is provided a process for the preparation of a carbonaceous molded body composed of a carbonaceous or graphitic material, which comprises mixing elastic graphite particles with a binder, molding the mixture and subjecting the molded body to a firing treatment (heat-treatment) and/or a graphitizing treatment to obtain a carbonaceous molded body having a light weight and an excellent elasticity, which is composed of a carbonaceous or graphitic material and has a bulk density lower than 1.0 g/cm$^3$ and a recovery ratio of at least 50% at a compressibility of 5 to 50%.

BEST MODE FOR CARRYING OUT THE INVENTION

Known elastic graphite materials can be used as the starting elastic graphite material in the present invention. There can be especially preferably used a product obtained by treating a carbonaceous mesophase and/or green coke formed by heat-treating petroleum or coal type pitch with nitric acid or a mixed acid of nitric acid and sulfuric acid and heat-treating and graphitizing the acid-treated material, and a graphite material obtained by treating carbonaceous mesophase and/or green coke with nitric acid or a mixed acid nitric acid and sulfuric acid, contacting the acid-treated material with a basic aqueous solution to render it soluble, adding an aqueous solution of an acid to the dissolved material to thereby to precipitate a carbonaceous component, and heat-treating and graphitizing the thus precipitated carbonaceous component.

The process for the preparation of these graphite materials having excellent elasticity characteristics is described in detail, for example, in Japanese Patent Laid-Open Publication No. 1-9808.

In the present invention, a granule of the above-mentioned elastic graphite material is used as the starting material, and in view of the adaptability to the molding operation, the starting graphite material has preferably a particle size of about 10 μm to about 1 mm.

Pitches such as coal tar pitch, bulk mesophase, thermosetting resins and thermoplastic resins are preferably used as the binder. It is important that the binder should be added in the form of a powder and/or a sheet and/or a film or a dispersion of a resin in a dispersion medium.

As the binder heretofore used for the production of molded bodies of carbonaceous materials and the like, there can be mentioned coal tar pitch, a phenolic resin and a furan resin. These binders are fusible at about 100° C., and molded bodies are formed by kneading an aggregate with such a binder in the fused state, curing and molding the kneaded mixture and firing (heat-treating) and/or graphitizing the molded body. However, the above-mentioned elastic graphite particles have a sponge-like micro-structure in which internal walls are partitioned by a carbon film, and it is considered that by dint of this specific structure, excellent characteristics such as light weight and compressive elasticity can be manifested. Therefore, if such elastic graphite particles are molded by using the conventional binder, the binder in the fused state intrudes into the interior of the elastic graphite particles and the elasticity of the elastic graphite material is degraded.

We furthered our research with a view to overcoming this defect, and as the result, it was found that if a powdery binder is used, the binding is caused in the state where the binder is partially contacted with the elastic graphite particles, and therefore, degradation of the elastic characteristics by intrusion of the binder into the sponge-like structure of the elastic graphite material is not caused and therefore a good molded body can be obtained.

It also was found that if a sheet-like binder is used, since the binding is effected in the state where the elastic graphite particles are pressed from above and below by the inserted sheets in sandwich-like form, intrusion of the binder into the sponge-like structure of the elastic graphite material or degradation of the elastic characteristics by this intrusion is not caused and a good molded body can be obtained.

As the powdery binder used in the present invention, there can be mentioned pitches such as coal tar pitch, bulk mesophase, thermosetting resins (such as a phenolic resin, a furan resin, an epoxy resin, an unsaturated polyester resin and a polyimide resin), and thermoplastic resins (such as a vinyl chloride resin, a vinyl fluoride resin and an acrylonitrile resin). As the sheet-like binder, there can be preferably used sheets and films of the above-mentioned thermosetting resins or thermoplastic resins, and adhesive tapes, carbon fiber sheets and prepreg sheets.

In the case where a dispersion type binder is used, the kind of the resin constituting the binder can be appropriately selected according to the intended use of the molded body. However, linear polymers that can be formed into fibers, such as polyethylene, an acrylic resin, an epoxy resin, a phenolic resin and an unsaturated polyester resin are preferably used. Water, an alcohol and an inorganic acid are preferably used as the dispersion medium. It is preferred that the resin be used in an amount of 0.1 to 4.0 parts by weight, especially 0.2 to 1.5 parts by weight, per part by weight of the dispersion medium.

A binder as mentioned above is added to the above-mentioned graphite particles as the filler (aggregate). In the present invention, the binder is incorporated so that the amount of the resin is 0.1 to 5 parts by weight, preferably 0.5 to 5 parts by weight, per part by weight of the elastic graphite particles. If the amount of the resin is larger than 5 parts by weight per part by weight of the elastic graphite particles, the bulk density of the obtained molded body tends to increase and no good results can be obtained.

In the case where a powdery binder is used as the binder, the binder is added to the elastic graphite material and they are sufficiently mixed, and the mixture is charged in a desired mold and compression-molded. In order to improve the characteristics of the molded body, it is preferred that the so-formed molded body be pulverized and the molding operation be conducted again. In this case, compression molding can be carried out under heating. Furthermore, the molded body can be heated to effect curing and carbonization of the binder, or the molded body can be further fired and/or graphitized.

In the case where a sheet-like binder is used as the binder, elastic graphite particles are uniformly dispersed on a binder sheet cut into an appropriate size, and another binder sheet is placed on the elastic graphite particles. By repeating this operation, the elastic graphite particles and the binder sheets are alternately laminated, and the molded body of the present invention can be prepared by subjecting the laminate to the above-mentioned molding operation. In this case, in order to improve the state of the contact between the binder and the elastic graphite material, a certain load can be applied to the above-mentioned laminate, or after application of this load, the laminate can be cured and subjected to a firing treatment and/or a graphitizing treatment.

In the case where the molded body is subjected to a firing treatment and/or a graphitizing treatment, the treatment can be accomplished by heating the molded body at a temperature of 2000° to 3000° C., especially 2600° to 3000° C.

Of the foregoing embodiments, the embodiment using the binder in the form of a dispersion is especially preferred for improving the elastic characteristics of the obtained molded body. In the dispersion type binder, a binder having a low viscosity is dispersed in spherical form in the dispersion medium, and if this binder is mixed and kneaded with elastic graphite particles as the filler, the binder is stretched in the yarn-like form and adheres like a spider web around the elastic graphite particles and becomes entangled therewith. In this case, the yarn-like or spider web-like entangled binder does not intrude into the interior of the sponge-like structure of the graphite particles but covers only the surfaces of the graphite particles. Since the function as the binder is exerted in this state, the elastic characteristics of the elastic graphite particles are not degraded at all.

In the case where the above-mentioned binder dispersion is used, when the binder is mixed with the filler, an appropriate amount of water can be added to form a good pasty mixture resembling a rice cake. This water can be added to the dispersion of the binder in advance. When the amount of the binder is too large and a slurry-like mixture is obtained, water can be appropriately removed by drying the formed mixture.

Except the embodiment where a sheet-like binder is used as the binder, a mixing method utilizing a shearing force can be adopted for mixing the binder with the filler. If this shearing mixing method is adopted, the manifestation of the above-mentioned micro-structure where the graphite particles are enclosed with the binder can be further promoted. This mixing can be accomplished by using various mixing apparatuses such as a static mixer and a Henschel mixer, and pulverizers such as a ball mill and a crushing mill can also be used.

The so-obtained molded body has such light weight and excellent elasticity characteristics as not possessed by conventional carbonaceous molded bodies. Of other properties possessed by carbonaceous materials, the heat resistance and corrosion resistance are influenced by the properties of the resin used as the binder and are sometimes lower than those of carbon materials, but the electroconductivity, sliding property and the like can be maintained at high levels, because the elastic graphite particles and the binder resin are uniformly mixed in the obtained molded body.

The present invention will now be described in detail with reference to the following examples.

EXAMPLE A1

Green coke obtained by the delayed coker method was finely pulverized to adjust the average particle size to 10 μm. The elemental composition of the pulverization product comprised 95.1% by weight of carbon, 3.1% by weight of hydrogen and 0.6% by weight of nitrogen. Then, 5 g of the pulverization product was added little by little to 100 ml of a mixed acid comprising 96% concentrated sulfuric acid and 70% concentrated nitric acid at a volume ratio of 50/50, which was charged in an Erlenmeyer flask having a capacity of 300 ml. After the addition of all of the pulverization product, the mixture was heated for 4 hours in an oil bath maintained at 80° C. Then, the mixture was filtered through a glass filter (No. 4), and the recovered solid was sufficiently washed with water and dried. The yield was 140% by weight. The recovered solid was dispersed in water and 2.5N NaOH was added to the dispersion with stirring until the pH value was 10. Then, the dispersion was filtered through a glass filter (No. 4), and 1N $HNO_3$ was added to the filtrate until the pH value was below 1, and aquamesophase was recovered by filtration using a glass filter (No. 4) and dried. The yield of the aquamesophase was 133% by weight based on the green coke. This aquamesophase was charged in a cylindrical glass vessel having a capacity of 500 ml, and the glass vessel was settled in a salt bath heated at 300° C. in advance and maintained in this state for 30 minutes. Then, the temperature of the thus heated product was elevated to 2800° C. at a rate of 400° C./hr in an argon gas flow and this temperature was maintained for 30 minutes to effect graphitization. The yields of the heated product and graphitized product were 85% by weight and 52% by weight, respectively, based on the green coke.

With respect to the graphitized sample, the compressive elasticity characteristics (compressibility and recovery ratio) were determined according to the following procedures.

A cylindrical vessel having an inner diameter of 10 mm was charged with 0.5 g of the sample pulverized to a size smaller than 0.30 mm, and a load of 1 kg/cm$^2$ was applied from above. The volume at this point was designated as the base volume ($h_0$). Then, a predetermined load was applied and the volume was measured. This volume was designated as $h_1$. Then, the load was removed and the volume $h_2$ was measured. The compressibility and recovery ratio were determined according to the following formulae:

*Compressibility* (%) = [($h_0 - h_1$)/$h_0$] × 100

*Recovery ratio* (%) = [($h_2 - h_1$)/($h_0 - h_1$)] × 100

Furthermore, the packing density was calculated from $h_0$ according to the following formula:

*Packing density* (g/cm$^3$) = (*weight of sample*)/$h_0$

The obtained results are shown in Table A1.

TABLE A1

| | Elastic Graphite Material | | | |
|---|---|---|---|---|
| | Packing Density (1 kg/cm$^2$) (g/cm$^3$) | Load (kg/cm$^2$) | Compressibility (%) | Recovery Ratio (%) |
| Examples A1, A2 and A4 | 0.23 | 500 | 84 | 84 |
| | | 5000 | 91 | 80 |
| Example A3 | 0.27 | 500 | 85 | 71 |
| | | 5000 | 88 | 70 |

This elastic graphite material was pulverized to a size smaller than 0.15 mm and mixed uniformly with a powder of a phenolic resin (Resitop PG3518 supplied by Gunei Kagaku) at a ratio shown in Table A2, and the mixture was filled in a mold and molded under a pressure of 2 ton/cm$^2$. In order to improve the characteristics of the molded body, the obtained molded body was pulverized and molded again. This operation was repeated 6 times. The obtained molded body was heated at a temperature-elevating rate of 30° C./hr and maintained at 180° C. for 3 hours to cure the phenolic resin. The compressive elasticity characteristics of the obtained body are shown in Table A3.

TABLE A2

| No. | Phenolic Resin (% by weight) | Elastic Graphite Material (% by weight) |
|---|---|---|
| 1 | 75 | 25 |
| 2 | 60 | 40 |

TABLE A3

| No. | Bulk Density (g/cc) | Load (kg/cm$^2$) | Compressibility (%) | Recovery Ratio (%) |
|---|---|---|---|---|
| 1 | 0.79 | 200 | 19 | 75 |
| 2 | 0.81 | 20 | 9 | 81 |

EXAMPLE A2

The same elastic graphite material as used in Example A1, which was pulverized to a size smaller than 0.30 mm, was uniformly dispersed on a double-coated adhesive tape (NM-10 supplied by Nichiban) cut into a size of 10 mm × 10 mm. The excessive elastic graphite material was removed, and another adhesive tape was piled on the dispersed elastic graphite material. This operation was repeated 50 times to obtain a molded body, in which the elastic graphite material/adhesive tape weight ratio was about 1/3.3. In order to improve the adhesiveness between the elastic graphite material and the resin, the molded body was preliminarily compressed under a pressure of 30 kg/cm$^2$, and then, the characteristics were measured. At this point, the molded body was placed in a frame having the same length and width as those of the molded body, and a load was applied. The obtained results are shown in Table A4.

EXAMPLE A3

The same green coke as used in Example A1 was pulverized to a size of 0.15 to 0.30 mm, and 5 g of the pulverized coke was added little by little to 100 ml of a mixed acid comprising 96% concentrated sulfuric acid and 70% concentrated nitric acid at a volume ratio of 50/50, which was charged in an Erlenmeyer flask having a capacity of 300 ml and was sufficiently cooled in an ice bath. After the addition of all of the pulverized coke, the mixture was maintained for 1 hour and transferred into 500 ml of water cooled with ice. The mixture was filtered through a glass filter (No. 4), and the recovered solid was sufficiently washed with water and dried. The yield was 154%. Then, the solid was heat-treated at 300° C. for 30 minutes, heated to 2800° C. in a Tammann furnace and maintained at this temperature for 30 minutes to effect graphitization. The yields of the heat-treated product and the graphitized product were 89.5% by weight and 57.6% by weight, respectively, based on the green coke.

The compressive elastic characteristics of the graphitized sample (elastic graphite material) were as shown in Table A1.

In the same manner as described in Example A2, a molded body was prepared by using the so-prepared elastic graphite. The characteristics of the molded body are shown in Table A4.

Comparative Example A1

Graphite for electrodes (EE-250 supplied by Toyo Carbon) was pulverized to a size smaller than 0.30 mm to obtain a graphite powder. A molded body was prepared by molding this graphite powder in the same manner as described in Example A2. The graphite powder/adhesive tape weight ratio was about 1/1. The results of the measurement of the characteristics are shown in Table A4.

Comparative Example A2

The same elastic graphite material as used in Example A2, which was pulverized to a size smaller than 0.30 mm, was mixed uniformly with a phenolic resin (VP80P supplied by Hitachi Kasei Kogyo) at an elastic graphite material/resin weight ratio of 40/60 or 50/50, and the mixture was filled in a mold and curing was carried out at 180° C. under a pressure of 80 kg/cm$^2$ for 30 minutes. Then, the post curing of the phenolic resin was conducted at 180° C. for 3 hours.

The compressive elasticity characteristics of the obtained molded body were as shown in Table A5.

the dispersion was filtered through a glass filter (No. 4), and 1N HNO$_3$ was added to the filtrate until the pH value was below 1 (the precipitate will be referred to as "aquamesophase" hereinafter), and aquamesophase was recovered by filtration using a glass filter (No. 4) and dried. The yield of the aquamesophase was 133% by weight based on the green coke. This aquamesophase was charged in a cylindrical glass vessel having a capacity of 500 ml, and the glass vessel was settled in a salt bath heated at 300° C. in advance and maintained in this state for 30 minutes. Then, the temperature was elevated to 2800° C. at a rate of 400° C./hr in an argon flow and this temperature was maintained for 30 minutes to effect graphitization. The yields of the heated product and graphitized product were 85% by weight and 52% by weight, respectively, based on the green coke.

With respect to the graphitized sample, the compressive elasticity characteristics (compressibility and recovery ratio) were determined according to the following procedures.

A cylindrical vessel having an inner diameter of 10 mm was charged with 0.5 g of the sample pulverized to a size smaller than 0.30 mm, and a load of 1 kg/cm$^2$ was applied from above. The volume at this point was designated as the base volume ($h_0$). Then, a predetermined load was applied and the volume was measured. This volume was designated as $h_1$. Then, the load was removed and the volume $h_2$ was measured. The compressibility and recovery ratio were determined according to the following formulae:

TABLE A4

| | No. | Weight Ratio (filler/binder) | Bulk Density (g/cm$^2$) | Load of 170 kg/cm$^2$ | | Load of 350 kg/cm$^2$ | |
|---|---|---|---|---|---|---|---|
| | | | | Compression ratio (%) | Recovery ratio (%) | Compressibility (%) | Recovery ratio (%) |
| Example A2 | 1 | 0.29 | 0.74 | 24 | 70 | 29 | 57 |
| | 2 | 0.30 | 0.67 | | | 34 | 55 |
| Example A3 | | 1.49 | 0.75 | 32 | 59 | 40 | 54 |
| Comparative | 1 | 0.89 | 1.44 | 19 | 48 | 20 | 32 |
| Example A1 | 2 | 1.10 | 1.05 | | | 24 | 7 |
| Adhesive Tape* | | 0 | 1.09 | 2 | 30 | 5 | 30 |

*product compressed under 30 kg/cm$^2$

TABLE A5

| | No. | Weight Ratio (filler/binder) | Bulk Density (g/cc) | Load (kg/cm$^2$) | Compressibility (%) | Recovery Ratio (%) |
|---|---|---|---|---|---|---|
| Comparative | 1 | 40/60 | 1.10 | 380 | 2.9 | 0 |
| Example A2 | 2 | 50/50 | 0.85 | 240 | 2.0 | 0 |

EXAMPLE B1

Green coke obtained by the delayed coker method was finely pulverized to adjust the average particle size to 10 μm. The elemental composition of the pulverization product comprised 95.1% by weight of carbon, 3.1% by weight of hydrogen and 0.6% by weight of nitrogen. Then, 5 g of the pulverization product was added little by little to 100 ml of a mixed acid comprising 96% concentrated sulfuric acid and 70% concentrated nitric acid at a volume ratio of 50/50, which was charged in an Erlenmeyer flask having a capacity of 300 ml. After the addition of all of the pulverization product, the mixture was heated for 4 hours in an oil bath maintained at 80° C. Then, the mixture was filtered through a glass filter (No. 4), and the recovered solid was sufficiently washed with water and dried. The yield was 140% by weight. The recovered solid was dispersed in water and 2.5N NaOH was added to the dispersion with stirring until the pH value was 10. Then,

*Compressibility* (%) = [($h_0 - h_1$)/$h_0$] × 100

*Recovery ratio* (%) = [($h_2 - h_1$)/($h_0 - h_1$)] × 100

Furthermore, the packing density was calculated from $h_0$ according to the following formula:

*Packing density* (g/cm$^3$) = (weight of sample)/$h_0$

The obtained results are shown in Table B1.

TABLE B1

| | Elastic Graphite Material | | | |
|---|---|---|---|---|
| | Packing Density (1 kg/cm$^2$) (g/cm$^3$) | Load (kg/cm$^2$) | Compressibility (%) | Recovery Ratio (%) |
| Examples B1 | 0.23 | 500 | 84 | 88 |
| | | 5000 | 91 | 84 |

TABLE B1-continued

| | Elastic Graphite Material | | | |
|---|---|---|---|---|
| | Packing Density (1 kg/cm²) (g/cm³) | Load (kg/cm²) | Compressibility (%) | Recovery Ratio (%) |
| Example B2 | 0.18 | 500 | 85 | 82 |
| | | 5000 | 91 | 77 |
| Example B3 | 0.35 | 500 | 84 | 86 |
| | | 5000 | 88 | 75 |

This elastic graphite material was pulverized to a size smaller than 0.15 mm and mixed uniformly with a powder of a phenolic resin (Resitop PG3518 supplied by Gunei Kagaku) at a ratio shown in Table B2, and the mixture was filled in a mold and molded under a pressure of 2 ton/cm$_2$. In order to improve the characteristics of the molded body, the obtained molded body was pulverized and molded again. This operation was repeated 4 times. The molded body was maintained at 180° C. for 3 hours to cure the phenolic resin, and the molded body was then heated to 800° C. at a temperature-elevating rate of 60° C./hr and maintained at this temperature for 1 hour to effect carbonization.

Then, the molded body was heated to 2800° C. at a temperature-elevating rate of 400° C./hr and maintained at this temperature for 30 minutes to effect graphitization and obtain a graphitized molded body.

The compressive elasticity characteristics of the obtained body were as shown in Table B3.

TABLE B2

| No. | Phenolic Resin (% by weight) | Elastic Graphite Material (% by weight) |
|---|---|---|
| 1 | 75 | 25 |
| 2 | 60 | 40 |

TABLE B3

| No. | Size (mm) (diameter × height) | | Bulk Density (g/cc) | Load (kg/cm²) | Compressibility (%) | Recovery Ratio (%) |
|---|---|---|---|---|---|---|
| 1 | 9.6 | 4.0 | 0.81 | 90 | 15 | 87 |
| 2 | 10.6 | 4.7 | 0.68 | 10 | 11 | 81 |

EXAMPLE B2

A vessel having a capacity of 5 liters was charged with 2 kg of FCC decanter oil, from which low-boiling-point components having a boiling point lower than about 500° C. was removed by reduced pressure distillation, and the oil was heated to 500° C. with stirring in a nitrogen gas current and maintained at this temperature for 2 hours. Heating and stirring were stopped and the oil was naturally cooled. When the interior temperature was lowered to 400° C., this temperature was maintained by heating. After 3 hours had passed from the point of start of natural cooling, about 1.6 kg of a pitch-like product was withdrawn from a withdrawal opening formed in the lower portion of the vessel. Quinoline was added to the pitch-like product in an amount about 3 times the amount of the pitch-like product, and the mixture was heated at about 300° C. and treated for 3 hours under reflux of quinoline. The insoluble component was recovered by centrifugal separation and fresh quinoline was added to the recovered insoluble component. The mixture was heated at 90° C. and subjected to centrifugal separation. The insoluble component was sufficiently washed with benzene and acetone and dried. The amount of the obtained insoluble component was 1.0 kg, and when the texture was observed by a polarization microscope, it was found that the entire surface had an anisotropic phase of the flow structure. Accordingly, the insoluble component was used as carbonaceous mesophase.

The elemental composition of the so-prepared carbonaceous mesophase comprised 93.4% of carbon, 3.6% of hydrogen and 0.5% of nitrogen. Then, 5 g of the carbonaceous mesophase having a particle size adjusted to 1.17 to 0.70 mm was added little by little to 100 ml of a mixed acid comprising 96% concentrated sulfuric acid and 70% concentrated nitric acid at a volume ratio of 50/50, which was charged in an Erlenmeyer flask having a capacity of 300 ml. After the addition of all of the carbonaceous mesophase, the mixture was heated for 60 minutes in an oil bath heated at 50° C. in advance. The mixture was filtered through a glass filter (No. 4), and the recovered solid was sufficiently washed with water and dried. The yield was 138.6% by weight. The dried solid was charged in a cylindrical glass vessel having a capacity of 500 ml, and the vessel was thrown into a salt bath heated at 300° C. in advance and maintained in this state for 30 minutes. The yield was 95.9% by weight based on the starting carbonaceous mesophase.

Then, the heat-treated product was heated to 2800° C. at a temperature-elevating rate of 400° C./hr and was maintained at this temperature for 30 minutes to effect graphitization. The yield was 65.0% by weight based on the carbonaceous mesophase.

With respect to the obtained elastic graphite material, the packing density and compressive elasticity characteristics (compressibility and recovery ratio) were determined in the same manner as described in Example B1. The obtained results are shown in Table B1.

The obtained elastic graphite material was pulverized to a size smaller than 0.10 mm and was molded in the same manner as described in Example B1. The molded body was fired and graphitized to obtain a graphitized molded body. The mixing ratio between the phenolic resin powder and elastic graphite was as shown in Table B4. The compressive elasticity characteristics of the obtained molded body are shown in Table B5.

TABLE B4

| No. | Phenolic Resin (% by weight) | Elastic Graphite (% by weight) |
|---|---|---|
| 3 | 75 | 25 |
| 4 | 60 | 40 |

TABLE B5

| No. | Size (mm) (diameter × height) | | Bulk Density (g/cc) | Load (kg/cm²) | Compressibility (%) | Recovery Ratio (%) |
|---|---|---|---|---|---|---|
| 3 | 12.1 | 3.5 | 0.97 | 200 | 9 | 94 |
| 4 | 12.9 | 2.9 | 0.94 | 200 | 22 | 71 |

EXAMPLE B3

An Erlenmeyer flask having a capacity of 300 ml was charged with 100 ml of a mixed acid comprising 96% concentrated sulfuric acid and 70% concentrated nitric acid at a volume ratio of 50/50, and the flask was cooled in an ice bath in advance. Then, 5 g of the same green coke as used in Example B1, which was pulverized to a size of 0.15 to 0.30 mm, was added little by little to the mixed acid. After the addition of all of the green coke, the mixture was maintained in this state for 1 hour, and mixture was poured into 500 ml of water cooled with ice. The mixture was filtered through a glass filter (No. 4) and the recovered solid was sufficiently washed with water and dried. The yield was 154.0% by weight. The solid was heat-treated and graphitized in the same manner as described in Example B1. The yield of the heat-treated product and graphitized product were 89.5% by weight and 57.6% by weight, respectively, based on the green coke. The results of the measurement of the compressive elasticity characteristics (compressibility and recovery ratio) of the obtained graphite are shown in Table B1.

The elastic graphite material pulverized to a size smaller than 0.30 mm was uniformly mixed with the same phenolic resin as used in Example B1 at a mixing ratio shown in Table B6, and the mixture was filled in a mold heated at 100° C. and compression-molded under a pressure of 50 kg/cm² for 5 minutes. After cooling, the molded body was taken out from the mold, heated to 1000° C. at a temperature-elevating rate of 30° C./hr and maintained at this temperature for 1 hour to effect carbonization and obtain a molded body. The compressive elasticity characteristics of the obtained molded body were as shown in Table B7.

Comparative Example B1

The same starting green coke as used in Example B3 was pulverized to a size of 0.15 to 0.30 mm and heated to 1000° C. at a temperature-elevating rate of 200° C./hr, and the coke was maintained at this temperature for 1 hour to effect calcination. Then, the calcination product was heated to 2800° C. at a rate of 400° C./hr and maintained at this temperature for 30 minutes to effect graphitization. The yield was 90.1% by weight based on the starting green coke. The graphitization product was pulverized to a size smaller than 0.30 mm and was then molded and carbonized in the same manner as described in Example B3. The compressive elasticity characteristics of the obtained molded body were as shown in Table B7.

Comparative Example B2

The same elastic graphite material as used in Example B2, which was pulverized to a size smaller than 0.30 mm, was mixed uniformly with a phenolic resin (VP80P supplied by Hitachi Kasei Kogyo) at an elastic graphite material/resin weight ratio of 40/60 or 50/50, and the mixture was filled in a mold and curing was carried out at 180° C. under a pressure of 80 kg/cm² for 30 minutes. Then, the post curing of the phenolic resin was carried out at 180° C. for 3 hours, and the cured product was heated to 800° C. at a temperature-elevating rate of 60° C./hr and maintained at this temperature for 1 hour to effect carbonization. The carbonization product was heated to 2800° C. at a temperature-elevating rate of 400° C./hr and maintained at this temperature for 30 minutes to effect graphitization and obtain a molded article. The compressive elasticity characteristics of the obtained molded body were as shown in Table B7.

TABLE B6

| No. | Phenolic Resin (% by weight) | Elastic Graphite (% by weight) |
| --- | --- | --- |
| Example B3 | 40 | 60 |
| Comparative Example B1 | 40 | 60 |
| Comparative Example B2 | ① 40 | 60 |
| Example B2 | ② 50 | 50 |

TABLE B7

| No. | Size (mm) (diameter × height) | | Bulk Density (g/cc) | Load (kg/cm²) | Compressibility (%) | Recovery Ratio (%) |
| --- | --- | --- | --- | --- | --- | --- |
| Example B3 | 13.6 | 5.6 | 0.49 | 15 | 18 | 51 |
| Comparative Example B1 | 13.4 | 5.2 | 1.13 | 50 | 1.2 | 67 |
| Comparative Example B2 | ① 9.7 ② 9.9 | 4.0 4.8 | 0.86 0.64 | 250 130 | 2.6 1.0 | 0 0 |

INDUSTRIAL APPLICABILITY

The elastic graphite molded body obtained according to the present invention has not only characteristics inherently possessed by graphite materials, such as electroconductivity and sliding property, but also excellent compressive elasticity characteristics. Accordingly, the elastic graphite molded body obtained according to the present invention can be used as gaskets, packings, shock resistance-improving materials, brake shoes, friction boards, electric wave-absorbing materials, catalyst carriers, heat-insulating materials and the like in various fields while utilizing these characteristics.

What is claimed is:

1. A process for preparing a carbonaceous molded body, comprising the steps of:
   mixing elastic graphite particles with a powdery binder selected from the group consisting of pitches, thermoplastic resins and thermosetting resins; wherein said powdery binder is contained in an amount of 0.1 to 5 parts by weight per part by weight of said elastic graphite particles;
   molding the thus obtained mixture to form a first molded body;
   pulverizing the first molded body to obtain pulverized graphite; and
   molding the thus obtained pulverized graphite to form a second molded body to thereby obtain a carbonaceous molded body having a light weight and an excellent elasticity, which has a bulk density lower than 1.0 g/cm³ and a recovery ratio of 50% or more at a compressibility of 5 to 50%.

2. A process according to claim 1, wherein the elastic graphite particles are those obtained by treating a carbonaceous mesophase and/or green coke with nitric acid or a mixed acid of nitric acid and sulfuric acid, and heat-treating and graphitizing the acid-treated product.

3. A process according to claim 1, wherein the elastic graphite particles are those obtained by treating a carbonaceous mesophase and/or green coke with nitric acid or a mixed acid of nitric acid and sulfuric acid, contacting the acid-treated product with a basic aqueous solution to render the acid-treated product soluble, adding an aqueous solution of an acid to the formed solution thereby to precipitate a carbonaceous component, and heat-treating and graphitizing the thus precipitated carbonaceous component.

4. A process according to claim 1, wherein the particle size of the elastic graphite particles is in the range of from 10 μm to 1 mm.

5. A process according to claim 1, which further comprises a step of firing and/or graphitizing the obtained carbonaceous molded body.

6. A process for preparing a carbonaceous molded body, comprising the steps of:

dispersing elastic graphite particles on a binder sheet;

superposing another binder sheet on the dispersed graphite particles; wherein each binder sheet is selected from the group consisting of pitches, thermoplastic resins and thermosetting resins;

optionally repeating the above two steps one or more times to thereby alternately laminate the graphite particles and the binder sheet; and subjecting the thus obtained laminate to a molding operation to thereby obtain a carbonaceous molded body having a light weight and an excellent elasticity, which has a bulk density lower than 1.0 g/cm$^3$ and a recovery ratio of 50% or more at a compressibility of 5 to 50%.

7. A process according to claim 6, wherein the elastic graphite particles are those obtained by treating a carbonaceous mesophase and/or green coke with nitric acid or a mixed acid of nitric acid and sulfuric acid, and heat-treating and graphitizing the acid-treated product.

8. A process according to claim 6, wherein the elastic graphite particles are those obtained by treating a carbonaceous mesophase and/or green coke with nitric acid or a mixed acid of nitric acid and sulfuric acid, contacting the acid-treated product with a basic aqueous solution to render the acid-treated product soluble, adding an aqueous solution of an acid to the formed solution thereby to precipitate a carbonaceous component, and heat-treating and graphitizing the thus precipitated carbonaceous component.

9. A process according to claim 6, wherein the particle size of the elastic graphite particles is in the range of from 10 μm to 1 mm.

10. A process according to claim 6, which further comprises a step of firing and/or graphitizing the obtained carbonaceous molded body.

* * * * *